United States Patent
Kasuga et al.

(10) Patent No.: US 8,535,575 B2
(45) Date of Patent: Sep. 17, 2013

(54) CURRENT-VOLTAGE NON-LINEAR RESISTOR AND METHOD OF MANUFACTURE THEREOF

(75) Inventors: Yasunori Kasuga, Tokyo (JP); Hideyasu Ando, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 765 days.

(21) Appl. No.: 12/630,138

(22) Filed: Dec. 3, 2009

(65) Prior Publication Data

US 2010/0140563 A1    Jun. 10, 2010

(30) Foreign Application Priority Data

Dec. 4, 2008  (JP) ................ P2008-310007

(51) Int. Cl.
*H01B 1/02*      (2006.01)

(52) U.S. Cl.
USPC ..... 252/519.5; 252/500; 252/513; 252/518.1; 252/519.51; 252/519.52; 257/686; 264/617; 338/21; 423/594.4

(58) Field of Classification Search
USPC .............. 252/519.52, 500, 513, 518.1, 519.1, 252/519.51; 257/686; 423/594.5, 594.4; 264/617; 338/21
See application file for complete search history.

(56) References Cited

U.S. PATENT DOCUMENTS

| | | | |
|---|---|---|---|
| 4,540,971 A * | 9/1985 | Kanai et al. | 338/21 |
| 4,681,717 A | 7/1987 | Brooks et al. | |
| 5,039,452 A | 8/1991 | Thompson et al. | |
| 5,143,711 A * | 9/1992 | Kluge et al. | 423/594.5 |
| 5,248,452 A * | 9/1993 | Imai et al. | 252/519.52 |

FOREIGN PATENT DOCUMENTS

| | | |
|---|---|---|
| DE | 33 35 354 A1 | 4/1985 |
| EP | 0 097 923 A1 | 1/1984 |
| EP | 0 497 566 A2 | 8/1992 |
| EP | 0 497 566 A3 | 8/1992 |
| EP | 0 761 622 A1 | 3/1997 |
| EP | 0 961 300 A2 | 12/1999 |
| EP | 0 961 300 A3 | 12/1999 |
| JP | 03-0838846 * | 4/1991 |
| JP | 5-3105 | 1/1993 |
| JP | 5-258914 | 10/1993 |
| JP | 2001-233668 | 8/2001 |
| JP | 2008-172034 | 7/2008 |

* cited by examiner

*Primary Examiner* — Khanh Tuan Nguyen
(74) *Attorney, Agent, or Firm* — Oblon, Spivak, McClelland, Maier & Neustadt, L.L.P.

(57) ABSTRACT

A current-voltage non-linear resistor (10) comprises a sintered body (20) of a mixture whose chief constituent is zinc oxide and including as auxiliary constituents at least bismuth (Bi), antimony (Sb), manganese (Mn), cobalt (Co) and nickel (Ni). Also, the average grain size of the mixture is no more than 0.4 μm; and the average grain size of the zinc oxide grains in the sintered body (20) is no more than 7.5 μm and the standard deviation based on the grain size distribution of zinc oxide grains in the sintered body (20) is no more than 15% of the average grain size of the zinc oxide grains.

3 Claims, 1 Drawing Sheet

CURRENT-VOLTAGE NON-LINEAR RESISTOR AND METHOD OF MANUFACTURE THEREOF

CROSS-REFERENCE TO RELATED APPLICATION

This application claims benefit of priority from Japanese Application No. JP 2008-310007 filed Dec. 4, 2008, the entire contents of which are incorporated by reference herein.

BACKGROUND OF THE INVENTION

1. Field of the Invention

The present invention relates to a current-voltage non-linear resistor and method of manufacture thereof, whose chief constituent is zinc oxide (ZnO), that may be employed in an over-voltage protection apparatus such as a surge arrester (or arrestor) or surge absorber.

2. Description of the Related Art

Over-voltage protection apparatus such as surge arresters or surge absorbers are commonly employed in order to protect power systems or the circuitry of electronic equipment from abnormal voltages. Such surge arresters or surge absorbers possess a non-linear resistance body, showing insulating properties under normal voltage but showing low resistance when subjected to abnormal voltage: they are thus effective for suppression of over-voltage. Such current-voltage non-linear resistors are ceramic bodies whose main constituent is zinc oxide (ZnO); at least one or more metal oxides are added thereto as additives in order to obtain a voltage non-linear resistance characteristic, and the material is then subjected to mixing, pelletizing, molding and sintering. An insulating layer of electrical insulating material is formed on the side faces of this sintered body in order to prevent flashover from the side faces during surge absorption.

Also, with the economic recession in recent years, miniaturization and improved performance of the equipment constituting power transmission installations is being sought, in order to reduce transmission costs in power systems. Current-voltage non-linear resistors whose chief constituent is zinc oxide are employed in surge arresters on account of their excellent non-linear resistance characteristic. If the current-voltage non-linear resistors that are employed in such surge arresters can be made of high resistance type, the number of current-voltage non-linear resistors that are provided in a laminated fashion in the surge arrester can be reduced, making it possible to miniaturize the transmission equipment.

Current-voltage non-linear resistors have been disclosed wherein, in order to make the current-voltage non-linear resistor of high resistance type, for example the content of auxiliary constituents such as $Bi_2O_3$, $CO_2O_3$, MnO, $Sb_2O_3$ and NiO is restricted, and wherein, furthermore, the crystalline phase of the $Bi_2O_3$ contained in the sintered body whose chief constituent is ZnO is restricted. An example is Laid-open Japanese Application No. Tokkai 2001-307909 (hereinbelow referred to as Patent Reference 1). With such current-voltage non-linear resistors, high resistance and an excellent non-linear resistance characteristic can be obtained.

Also, current-voltage non-linear resistors have been disclosed that are of high resistance and in which an excellent non-linear resistance characteristic is obtained by addition of rare earth oxides in a current-voltage non-linear resistor whose chief constituent is zinc oxide and to which $Bi_2O_3$, $CO_2O_3$, MnO, $Sb_2O_3$ or the like have been added. Examples are Published Japanese Patent Nos. 2904178, 2933881, 2940486, and 3165410 (hereinbelow referred to as Patent References 2 to 5).

The technique has also been disclosed of obtaining current-voltage nonlinear resistors having a high resistance and excellent temporary overvoltage energy absorption capability, by employing solely rare earth raw materials having a grain growth suppressing effect to prepare very fine-grained powder beforehand. An example is to be found in Laid-open Japanese Patent Application No. Tokkai 2001-233668 (hereinbelow referred to as Patent Reference 6).

Also, in recent years, in order to achieve sufficient miniaturization of surge arresters, current-voltage non-linear resistors are being sought that have not merely high resistance but also reduced diameter.

However, when a current-voltage non-linear resistor is increased in resistance or reduced in diameter, the energy generated per unit volume when performing surge energy absorption becomes larger. Further improvement in performance is therefore required by example improving the energy absorption capability (or temporary overvoltage energy absorption capability) or by reducing to a minimum the generated energy, by improvement in the non-linear resistance characteristic. Also, a current-voltage non-linear resistor has the characteristic that its resistance decreases with rise in temperature. Consequently, if the current-voltage non-linear resistor is made smaller in diameter, as the temperature rises due to generation of heat produced by Joule heating after absorption of surge energy, the leakage current is increased, with the risk that thermal runaway of the surge arrester may be caused by the mains-frequency current after absorption of surge energy. For these reasons, the size of conventional current-voltage non-linear resistors was restricted and their range of application was limited. In the case of conventional surge arresters, it was therefore difficult to achieve sufficient reduction in diameter.

Also, although, in the case of conventional current-voltage non-linear resistors, the technique may be adopted of employing solely rare earth raw materials having a grain growth suppressing effect to prepare very fine-grained powder beforehand, if very fine-grained powder prepared beforehand is employed solely for a portion of the raw material, when this is mixed with another raw material, aggregation of the grains of the very fine-grained powder takes place. Uniform mixing of the powder was thus difficult to achieve. This impaired the beneficial effect of the use of fine grains, with the result that the properties of the current-voltage non-linear resistor that was finally manufactured became non-uniform, leading to the problem that the target performance could not be obtained.

SUMMARY OF THE INVENTION

The present invention was made in order to solve the above problems, its object being to provide a current-voltage non-linear resistor and method of manufacture thereof whereby higher resistance could be achieved, of excellent non-linear resistance characteristics, energy absorption capability and thermal stability.

In order to achieve the above object, a current-voltage non-linear resistor according to the present invention may be constituted as follows. Specifically, a current-voltage non-linear resistor comprising:

a sintered body of a mixture whose chief constituent is zinc oxide (ZnO) and including as auxiliary constituents at least bismuth (Bi), antimony (Sb), manganese (Mn), cobalt (Co) and nickel (Ni) is characterized in that the average grain size of aforementioned mixture is no more than 0.4 μM, the average grain size of the zinc oxide grains in aforementioned sintered body is no more than 5 μM and the standard deviation based on the grain size distribution of zinc oxide grains in aforementioned sintered body is no more than 15% of the average grain size of aforementioned zinc oxide grains.

Also, a method of manufacturing a current-voltage non-linear resistor according to the present invention is constituted as follows. Specifically, a method of manufacturing a current-voltage non-linear resistor comprising a sintered body of a mixture whose chief constituent is zinc oxide (ZnO) and including as auxiliary constituents at least bismuth (Bi), antimony (Sb), manganese (Mn), cobalt (Co) and nickel (Ni) is characterized in that it comprises: a pulverizing step of manufacturing a slurry by introducing into a wet pulverizing apparatus a mixture containing, as chief constituent, 95 mol % or more of zinc oxide, and, as auxiliary constituents, 0.3 to 1 mol % of $Bi_2O_3$, 0.5 to 2.5 mol % of $Sb_2O_3$, 0.3 to 1.5 mol % of $CO_2O_3$, 0.2 to 2 mol % of MnO, and 0.5 to 3 mol % of NiO, respectively calculated as $Bi_2O_3$, $Sb_2O_3$, $CO_2O_3$, MnO, and NiO, and an organic solvent such that the content of aforementioned mixture is 30 to 60 weight %, and mixing, while pulverizing, aforementioned mixture such that the average grain size of aforementioned mixture is no more than 0.4 μm; a pelletized powder forming step of spraying aforementioned slurry and forming pelletized powder of grain size 70 to 130 μm; a molding step of forming a molding having a prescribed shape by applying a load of a prescribed pressure to aforementioned pelletized powder; a first heating step of removing aforementioned organic solvent by heating aforementioned molding to a first temperature of 350 to 500° C. and maintaining aforementioned first temperature for a prescribed time; a second heating step of heating the molding from which aforementioned organic solvent has been removed to a second temperature of 900 to 1300° C. and sintering by maintaining aforementioned second temperature for a prescribed time; and a cooling step of cooling aforementioned sintered molding.

With the current-voltage non-linear resistor and method of manufacture thereof according to the present invention, higher resistance can be achieved and also excellent non-linear resistance properties, energy absorption capability (or temporary overvoltage energy absorption capability) and thermal stability.

DETAILED DESCRIPTION OF THE PREFERRED EMBODIMENTS

Practical examples of the present invention are described below with reference to the drawings.

Figure 1:
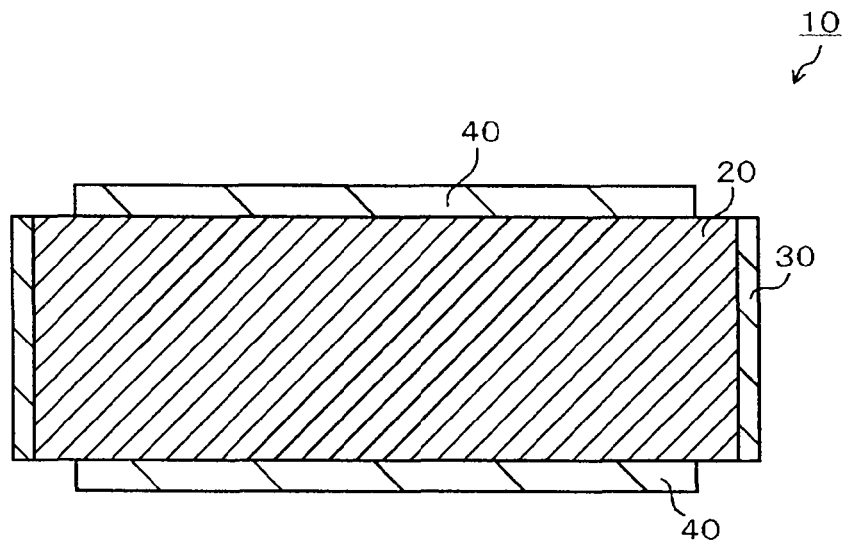
FIG. 1 is a view showing a cross-section of a current-voltage non-linear resistor according to the present invention.

FIG. 1 is a view showing a cross-section of a current-voltage non-linear resistor 10 according to the present invention. As shown in FIG. 1, a current-voltage non-linear resistor 10 according to the present invention is characterized in that it comprises a sintered body 20 of a mixture whose chief constituent is zinc oxide (ZnO) and including as auxiliary constituents at least bismuth (Bi), antimony (Sb), manganese (Mn), cobalt (Co) and nickel (Ni) wherein the average grain size of the mixture is no more than 0.4 μm, the average grain size of the zinc oxide grains in the sintered body 20 is no more than 7.5 μm and the standard deviation based on the grain size distribution of zinc oxide grains in the sintered body 20 is no more than 15% of the average grain size of the zinc oxide grains. Also, the current-voltage non-linear resistor 10 comprises an insulating layer 30 that covers the side faces of the sintered body 20 and electrodes 40 that are formed at the upper and lower faces of the sintered body 20.

By making the average grain size of the mixture including zinc oxide, bismuth, antimony, manganese, cobalt and nickel no more than 0.4 μm, non-uniformity of the microstructure and non-uniformity of the non-linear resistance characteristic produced by aggregation of the raw material is suppressed. Also, by making the average grain size of the mixture no more than 0.4 μm, the spinel grains or other raw materials having a grain growth suppressing effect on the zinc oxide grains in the sintered body 20 are caused to be uniformly distributed in the entire microstructure, thereby increasing the fineness of the zinc oxide grains in the sintered body 20. In this way, higher resistance of the current-voltage non-linear resistor 10 can be achieved. Furthermore, since grain growth of the zinc oxide grains proceeds uniformly in the sintering step whereby the mixture is converted into the sintered body 20, local deflections of the electrical conduction path are eliminated, so that a current-voltage non-linear resistor 10 having an excellent non-linear resistance characteristic, thermal stability at high temperature and temporary overvoltage energy absorption capability is obtained. In contrast, if the average grain size of the mixture exceeds 0.4 μm, local deflections of the electrical conduction path are produced, with the result that an excellent non-linear resistance characteristic, thermal stability at high temperature and temporary overvoltage energy absorption capability cannot be achieved. It was noted that, although it is preferable that the average grain size of the mixture was as small as possible, when pulverizing the mixture there are limitations in regard to manufacture, so that the lower limit of the average grain size of the mixture is about 0.05 μm.

Also, it is preferable that the standard deviation based on the grain size distribution of the mixture was no more than 75% of the average grain size of the mixture. By keeping the standard deviation based on the grain size distribution of the mixture at no more than 75% of the average grain size of the mixture, it can be ensured that the raw material is uniformly dispersed and that grain growth of the zinc oxide grains in the sintering step proceeds uniformly, so that the grain size of the zinc oxide grains in the sintered body 20 is made more uniform. In this way, a current-voltage non-linear resistor 10 having an excellent non-linear resistance characteristic, thermal stability at high temperature and energy absorption capability can be obtained. In contrast, if the standard deviation based on the grain size distribution of the mixture exceeds 75% of the average grain size of the mixture, it becomes difficult to achieve uniformity of the grain size of the zinc oxide grains in the sintered body 20, with the result that an excellent non-linear resistance characteristic, thermal stability at high temperature and energy absorption capability cannot be obtained.

The average grain size of the powder mixture is measured using for example a grain size distribution measurement apparatus of the laser diffraction/dispersion type. Also, this average grain size is the average grain size at median diameter. Also, the standard deviation is found using the grain size distribution of the mixture measured by the above grain size distribution measurement apparatus.

In contrast, the average grain size of the zinc oxide grains in the sintered body 20 is found by using a scanning electron microscope (SEM) to observe the reflected electron image of the specular ground surface of a sample cut out from the interior of the sintered body 20. Specifically, a number of samples are cut out and SEM photographs are taken with magnifications of for example 1000 times at several locations with different fields of view for each sample, and the average grain size of zinc oxide grains in the sintered body 20 is found by measuring the grain size of for example 3000 to 5000 zinc oxide grains. Also, the standard deviation is calculated from the grain size distribution of the zinc oxide grains in the sintered body 20 obtained from the average grain size measured as described above. For example the zinc oxide grains, spinel grains, bismuth oxide layer, and pores etc can be identified by color in the observation photograph of the reflected electron image.

Also, by keeping the standard deviation obtained from the grain size distribution of zinc oxide grains in the sintered body 20 constituting the current-voltage non-linear resistor 10 at no more than 15% of the average grain size of the zinc oxide grains, the grain size of the zinc oxide is made more uniform, so the microstructure of the sintered body 20 is made more uniform. Consequently, local deflections of the electrical conduction path are eliminated, so that an excellent non-linear resistance characteristic, thermal stability at high temperature and energy absorption capability can be obtained.

Preferably also, the average grain size of the spinel grains whose chief constituent is $Zn_7Sb_2O_{12}$ in the sintered body constituting the current-voltage non-linear resistor 10 is no more than 1 μm and the standard deviation of the grain size distribution of the spinel grains whose chief constituent is $Zn_7Sb_2O_{12}$ in the sintered body is no more than 40% of the average grain size of the spinel grains.

As described above, in order to increase the resistance of the current-voltage non-linear resistor 10 whose chief constituent is zinc oxide, it is necessary to increase the fineness of the grain size of the zinc oxide grains. The spinel grains ($Zn_7Sb_2O_{12}$) formed chiefly of zinc oxide and antimony trioxide ($Sb_2O_3$) have the property of suppressing grain growth of the zinc oxide grains in the sintering step. However, if a large number of spinel grains, which are insulators, is locally present, or if there is deviation in the size of the spinel grains, the available electrical current paths are restricted, lowering the energy absorption capability. Consequently, as described above, by making the average grain size of the spinel grains no more than 1 μm and the standard deviation, based on the grain size distribution of the spinel grains, no more than 40% of the average grain size of the spinel grains, the grain size of the zinc oxide in the sintered body 20 can be made uniform and deviation in the size of the spinel grains can be reduced. A current-voltage non-linear resistor 10 having excellent non-linear resistance characteristics, thermal stability at high temperature and energy absorption capability can thus be obtained.

It was noted that the lower limit of the average grain size of the spinel grains is about 0.1 μm, for reasons such as the spinel grain generation reaction during sintering. Also, the standard deviation based on the grain size distribution of spinel grains and the average grain size of the spinel grains can be found by the same method as the method of finding the average grain size etc of zinc oxide grains described above.

Also, as auxiliary constituents contained in the mixture, preferably 0.3 to 1 mol % of $Bi_2O_3$, 0.5 to 2.5 mol % of $Sb_2O_3$, 0.3 to 1.5 mol % of $CO_2O_3$, 0.2 to 2 mol % of MnO, and 0.5 to 3 mol % of NiO, respectively calculated as $Bi_2O_3$, $Sb_2O_3$, $CO_2O_3$, MnO, and NiO are included. In addition, at least 95 mol % of the chief constituent, zinc oxide, is preferably included.

The reason why it is preferable to have a bismuth content, calculated as $Bi_2O_3$, of 0.3 to 1 mol % is that $Bi_2O_3$ is a constituent that causes non-linear resistance characteristics to be manifested by being present at the boundaries of the zinc oxide main constituent, so, if the content of $Bi_2O_3$ is less than 0.3 mol %, sufficient benefit in terms of causing this non-linear resistance characteristic to be manifested is not achieved, and also, if the $Bi_2O_3$ content is greater than 1 mol %, the non-linear resistance characteristics are adversely affected.

The reason why it is preferable to have an antimony content, calculated as $Sb_2O_3$, of 0.5 to 2.5 mol % is that $Sb_2O_3$ is a constituent that has the action of suppressing and making uniform grain growth of the zinc oxide grains during formation of the zinc oxide and spinel grains in sintering, thus having the effect of improving the non-linear resistance characteristics, so, if the content of $Sb_2O_3$ is less than 0.5 mol %, sufficient improvement in the non-linear resistance characteristic is not achieved. Also, if the $Sb_2O_3$ content is greater than 2.5 mol %, the electrically insulating constituents in the sintered body 20 are increased, adversely affecting thermal stability and energy absorption capability.

The reason why it is preferable to have a cobalt content, calculated as $CO_2O_3$, of 0.3 to 1.5 mol % is that the $CO_2O_3$ is a constituent that is effective for increasing and improving the non-linear resistance characteristics by solid solution chiefly in the spinel grains, so, if the content of $CO_2O_3$ is less than 0.3 mol %, sufficient benefit in terms of improving this non-linear resistance characteristic is not achieved, and also, if the $Co_2O_3$ content is greater than 1.5 mol %, the electrically insulating constituents in the sintered body 20 are increased, adversely affecting energy absorption capability.

The reason why it is preferable to have a manganese content, calculated as MnO, of 0.2 to 2 mol % is that the MnO is a constituent that is effective for increasing and improving the non-linear resistance characteristics by solid solution chiefly in the spinel grains, so, if the content of MnO is less than 0.2 mol %, sufficient benefit in terms of improving this non-linear resistance characteristic is not achieved, and also, if the MnO content is greater than 2 mol %, the electrically insulating constituents in the sintered body 20 are increased, adversely affecting thermal stability.

The reason why it is preferable to have a nickel content, calculated as NiO, of 0.5 to 3 mol % is that the NiO is a constituent that is effective for increasing and improving the non-linear resistance characteristics by solid solution chiefly in the spinel grains, so, if the content of NiO is less than 0.5 mol %, sufficient benefit in terms of improving this non-linear resistance characteristic is not achieved, and also, if the NiO content is greater than 3 mol %, the electrically insulating constituents in the sintered body 20 are increased, adversely affecting energy absorption capability.

The reason why it is preferable to have a zinc oxide content, which is the chief constituent, of at least 95 mol % is that if the content of zinc oxide is less than 95 mol %, the electrically insulating constituents in the sintered body 20 are increased, adversely affecting energy absorption capability and thermal stability.

Excellent thermal stability of the current-voltage non-linear resistor 10 at high temperature is achieved by the inclusion of the auxiliary constituents and the zinc oxide, which is the main constituent, in the range as described above, thanks to the synergetic effect of the auxiliary constituents described above and the main constituent.

The insulating layer 30 that covers the side faces of the sintered body 20 is constituted for example of an inorganic insulator such as glass frit, which is an electrically insulating material. This insulating layer 30 is formed by coating or spraying, followed by heat treatment, of an electrical insulating material, for example as described above, onto the side faces of the sintered body 20. Preferably, from the point of view of insulating performance and mechanical strength, the thickness of the insulating layer 30 is about 0.05 to 0.2 mm.

The electrodes 40 that are formed on the upper and lower faces of the sintered body 20 are constituted for example of material such as aluminum or silver having electrical conductivity. The electrodes 40 are formed by for example thermal spraying of conductive material as described above onto the upper and lower surfaces of the sintered body 20. Preferably, from the point of view of adhesion with the sintered body 20, the thickness of the electrodes 40 is about 0.05 to 0.15 mm.

The current-voltage non-linear resistor 10 according to the present invention has for example a cylindrical shape of diameter 20 to 150 mm, thickness 1 to 50 mm. However, the current-voltage non-linear resistor 10 is not restricted to this shape.

Also, the varistor voltage ($V_1$), which is the voltage when current of 1 mA of commercial frequency (line frequency in the U.S.A. or mains frequency in the U.K.) is passed through the current-voltage non-linear resistor 10 according to the invention may be 400V/mm or more.

Next, a method of manufacturing a current-voltage non-linear resistor 10 according to the present invention will be described.

First of all, a mixture is weighed out and prepared containing as chief constituent at least 95 mol % of zinc oxide, and, as auxiliary constituents, 0.3 to 1 mol % of $Bi_2O_3$, 0.5 to 2.5 mol % of $Sb_2O_3$, 0.3 to 1.5 mol % of $CO_2O_3$, 0.2 to 2 mol % of MnO, and 0.5 to 3 mol % of NiO, respectively calculated as $Bi_2O_3$, $Sb_2O_3$, $CO_2O_3$, MnO, and NiO.

Next, the mixture that has been prepared and an organic solvent prepared such that the content of this mixture is 30 to 60 weight % are introduced into a wet pulverizing apparatus and the mixture is mixed while pulverizing such that the average grain size of the mixture is no more than 0.4 μm, thereby preparing a slurry. As the organic solvent (binding agent), a mixture of for example water and an organic binder such as polyvinyl alcohol may be employed.

As the wet pulverizing apparatus there may be employed for example an apparatus of the circulatory type employing zirconia beads of diameter 0.05 to 0.3 mm. The wet pulverizing apparatus is operated with the conditions of bead packing ratio in the vessel of 35 to 95%, rotational speed of 500 to 1500 rpm of the stirring rotor, and circulatory flow rate of 5 to 50 L/min.

A pelletized powder is then manufactured by spraying the slurry that was thus obtained, using a rotary disc system or pressure nozzle system, and pelletizing. Preferably the grain size of the pelletized powder is 70 to 130 μm. The grain size is measured using for example a laser diffraction/dispersion type grain size distribution measurement apparatus as described above. The reason for specifying a grain size of the pelletized powder of 70 to 130 μm as preferable is in order to obtain a fine molding of good molding characteristics.

A molding is manufactured by molding the pelletized powder obtained into a cylindrical shape using for example a hydraulic press molding machine.

Next, this molding is heated to a first temperature of 350 to 500° C. and is maintained at this temperature for example 1 to 3 hours in order to remove the organic solvent.

Next, the molding is heated to a second temperature of 900 to 1300° C. and sintering is performed by maintaining at this temperature for example at least two hours. Sintering may be performed by heating to a temperature (350 to 500° C.) such as to remove the organic solvent, then temporarily cooling to normal temperature, followed by heating to the sintering temperature, or may be performed by heating to a temperature (350 to 500° C.) such as to remove the organic solvent, then heating to the sintering temperature. Also, sintering may be performed by for example employing a tunnel-type continuous furnace and arranging the molding in a refractory vessel made of for example alumina or mullite. Also, from the point of view of temperature uniformity in the sintered product and sintering process lead time, a heating rate from the first temperature to the second temperature of 50 to 200° C./hour is preferable.

After lapse of the holding time at the second temperature, the sintered molding is cooled. Also, from the point of view of temperature uniformity in the sintered product and sintering process lead time, a cooling rate when cooling of 100 to 200° C./hour is preferable. On completion of this cooling step, the sintered body 20 is obtained.

An insulating layer 30 is formed by coating or spraying inorganic insulating material as described above onto the side faces of the sintered body 20 constituted by the cooled molding, followed by heat treatment for 1 to 5 hours at a temperature of 300 to 500° C.

In addition, the upper and lower end faces of the sintered body 20 are ground and electrodes 40 formed on these ground faces by for example thermal spraying of conductive material as described above.

It was noted that there is no particular restriction regarding the order of performance of the step of forming the insulating layer 30 and the step of forming the electrodes 40, and either may be performed first.

A current-voltage non-linear resistor 10 is manufactured in this way by the steps described above.

As described above, with the current-voltage non-linear resistor 10 and method of manufacture thereof according to the present invention, spinel grains or other raw material having a grain growth suppressing effect on the zinc oxide grains in the sintered body 20 are uniformly dispersed in the entire microstructure, so increased fineness of the zinc oxide grains in the sintered body 20 can be achieved. In this way, higher resistance of the current-voltage non-linear resistor 10 can be achieved. In addition, with the current-voltage non-linear resistor 10 and method of manufacture thereof according to the present invention, grain growth of the zinc oxide grains in the sintering step proceeds uniformly, so that local deflections of the electrical conduction path are eliminated, so that an excellent non-linear resistance characteristic, thermal stability at high temperature and energy absorption capability are obtained.

Next, a more detailed description will be given concerning the excellent properties possessed by a current-voltage non-linear resistor 10 according to the present invention.

(Effect of the Average Grain Size of the Mixture)

The effect of the average grain size of the mixture containing as chief constituent zinc oxide (ZnO) and as auxiliary constituents at least bismuth (Bi), antimony (Sb), manganese (Mn), cobalt (Co) and nickel (Ni) on the properties of the current-voltage non-linear resistor will now be described.

Figure 2:
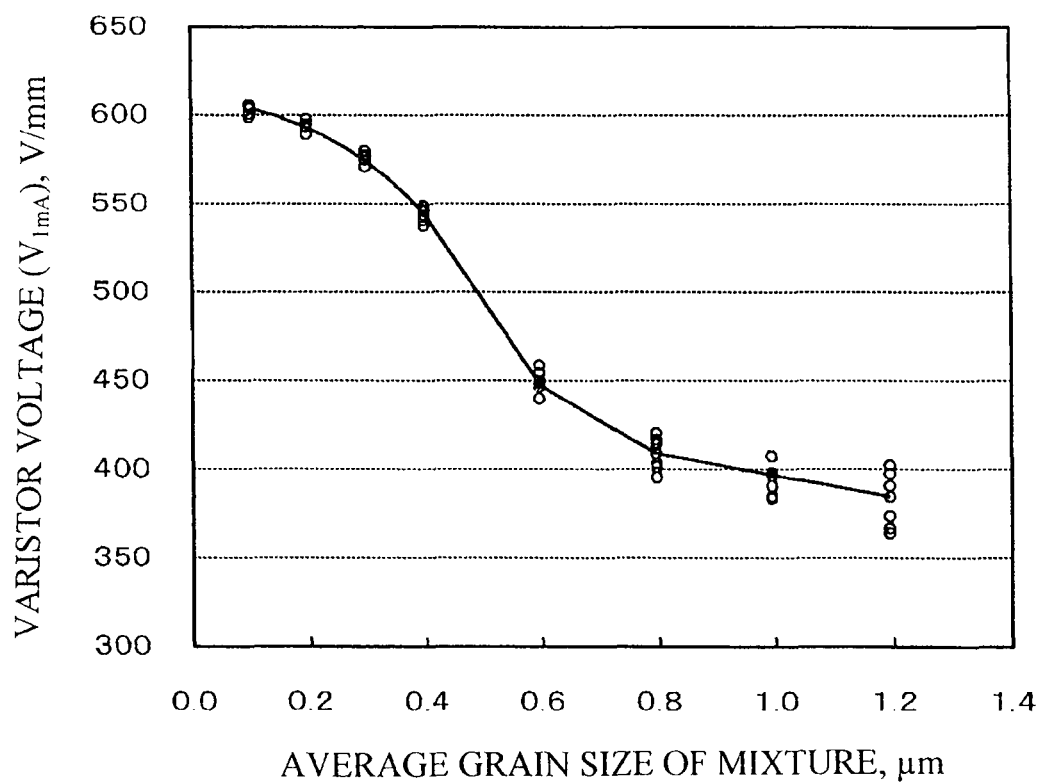
FIG. 2 is a view showing the relationship between the average grain size of the mixture and the varistor voltage ($V_{1mA}$) for sample No. 1 to sample No. 8.

Table 1 shows the sintering temperature, the average grain size of the mixture, the varistor voltage ($V_{1mA}$), the coefficient of non-linearity ($V_{10kA}/V_{1mA}$), the resistive leakage current ($I_R$) and the energy absorption capability in the current-voltage non-linear resistors of sample No. 1 to sample No. 24. In Table 1, the symbol "*" indicates samples outside the scope of the present invention: samples to which this symbol is affixed are comparative examples. Also, FIG. 2 is a view showing the relationship between the average grain size of the mixture and the varistor voltage ($V_{1mA}$) in respect of sample No. 1 to sample No. 8.

TABLE 1

| Sample number | Sintering temperature °C. | Average grain size μm | Varistor voltage ($V_{1mA}$), V/mm | Coefficient of non-linearity ($V_{10kA}/V_{1mA}$) | Resistive leakage current mA | Energy absorption capability J/cc |
|---|---|---|---|---|---|---|
| 1* | 1100 | 1.2 | 386 | 1.549 | 19.2 | 402 |
| 2* | 1100 | 1 | 398 | 1.542 | 18.3 | 415 |
| 3* | 1100 | 0.8 | 411 | 1.527 | 17 | 421 |
| 4* | 1100 | 0.6 | 449 | 1.498 | 15.6 | 450 |
| 5 | 1100 | 0.4 | 547 | 1.413 | 12.6 | 521 |
| 6 | 1100 | 0.3 | 577 | 1.388 | 10.9 | 558 |
| 7 | 1100 | 0.2 | 594 | 1.372 | 10.4 | 583 |
| 8 | 1100 | 0.1 | 605 | 1.367 | 10.2 | 596 |
| 9* | 1150 | 1.2 | 340 | 1.56 | 17.1 | 416 |
| 10* | 1150 | 1 | 357 | 1.555 | 16.3 | 436 |
| 11* | 1150 | 0.8 | 364 | 1.548 | 15.7 | 456 |
| 12* | 1150 | 0.6 | 406 | 1.518 | 14.4 | 489 |
| 13 | 1150 | 0.4 | 496 | 1.432 | 10.7 | 559 |
| 14 | 1150 | 0.3 | 530 | 1.409 | 9 | 587 |
| 15 | 1150 | 0.2 | 554 | 1.392 | 8.4 | 619 |
| 16 | 1150 | 0.1 | 563 | 1.383 | 8.2 | 632 |
| 17* | 1200 | 1.2 | 296 | 1.592 | 16.1 | 431 |
| 18* | 1200 | 1 | 302 | 1.585 | 15.7 | 462 |
| 19* | 1200 | 0.8 | 320 | 1.572 | 15 | 476 |
| 20* | 1200 | 0.6 | 355 | 1.541 | 13.7 | 512 |
| 21 | 1200 | 0.4 | 438 | 1.451 | 9.2 | 599 |
| 22 | 1200 | 0.3 | 466 | 1.436 | 8.1 | 632 |
| 23 | 1200 | 0.2 | 507 | 1.422 | 7.8 | 659 |
| 24 | 1200 | 0.1 | 512 | 1.419 | 7.4 | 672 |

First of all, as the chief constituent, zinc oxide (ZnO) was employed. To this were then added, as auxiliary constituents, respectively 0.5 mol % of bismuth oxide ($Bi_2O_3$), manganese oxide (MnO) and nickel oxide (NiO), 1 mol % of cobalt oxide ($CO_2O_3$), 2 mol % of antimony trioxide ($Sb_2O_3$), and 0.005 mol % of aluminum in the form of an aqueous solution of aluminum hydroxide ($Al(OH)_3$). The balance was zinc oxide.

A combined material consisting of a mixture prepared as described above and water and organic binder prepared such that the content of this mixture was 40 weight % was introduced into a circulatory-type wet pulverizing apparatus. Also, in this wet pulverizing apparatus, zirconia beads of diameter 0.3 mm were employed, and pulverizing and mixing were performed with a packing ratio of the beads in the vessel of 80%, a rotational speed of the stirring rotor of 1000 rpm, and a circulatory flow rate of 10 L/min. Pulverization was conducted in the wet pulverizing apparatus so that the average grain size of the mixture had the values of sample No. 1 to sample No. 24 shown in Table 1. Uniformly mixed slurries were obtained by the pulverizing and mixing treatment performed in this wet pulverizing apparatus.

The average grain size of the mixture was measured using a grain size distribution measurement apparatus of the laser diffraction/dispersion type, in the condition of a solution of the mixture as extracted from the wet pulverizing apparatus. Also this average grain size is the average grain size at the median diameter.

Spray pelletization of this slurry was then conducted using a spray drier, to obtain grain sizes of 70 to 130 μm. Moldings were then produced by molding the pelletized powder obtained into cylindrical shapes of diameter 125 mm, thickness 30 mm using for example a hydraulic press molding machine.

Next, these moldings were heated to a temperature of 500° C. and held at this temperature for two hours to remove the organic binder constituted by the organic solvent.

Next, the temperature of the moldings was temporarily cooled to normal temperature, after which the moldings were heated to the respective sintering temperatures of 1100 to 1200° C. shown in Table 1, and sintering conducted while maintaining at these temperatures for three hours. Sintering was conducted by placing the moldings in an alumina refractory vessel and employing a tunnel-type continuous furnace. The heating rate from 500° C. to the respective sintering temperatures of 1100 to 1200° C. shown in Table 1 was 100° C./hour.

After the lapse of the holding time of the respective sintering temperatures of 1100 to 1200° C. shown in Table 1, the sintered moldings were cooled. The cooling rate during cooling was 100° C./hour. Sintered bodies were obtained on completion of this cooling step.

Next, an insulating layer was formed by heat treatment for two hours at a temperature of 500° C. after coating the side faces of the sintered bodies constituted by the cooled moldings with glass frit. Current-voltage non-linear resistors were then obtained by grinding the upper and lower end faces of the sintered bodies and forming electrodes by thermal spraying of aluminum onto the ground faces.

The varistor voltage ($V_{1mA}$), non-linear resistance characteristic, thermal stability and energy absorption capability of the current-voltage non-linear resistors of sample No. 1 to sample No. 24 which were thus obtained were then evaluated.

The evaluation of the varistor voltage ($V_{1mA}$) was conducted in accordance with JEC0202-1994, in which the varistor voltage ($V_{1mA}$), which is the voltage when a current of 1 mA of commercial frequency is passed therethrough, is measured. Larger values of this varistor voltage ($V_{1mA}$) indicate superior performance in that higher resistance is achieved.

In the evaluation of the non-linear resistance characteristic, the varistor voltage ($V_{1mA}$) referred to above and the voltage ($V_{10kA}$) when an impulse current of 10 kA was passed for 8×20 μs were measured, and the coefficient of non-linearity was evaluated as the ratio of these ($V_{10kA}/V_{1mA}$). Smaller values of this coefficient of non-linearity indicate superior non-linear resistance characteristics.

In the evaluation of thermal stability, thermal stability was evaluated in terms of the resistive leakage current ($I_R$) when the resistive leakage current ($I_R$) was measured by applying AC voltage of 90% of the varistor voltage ($V_{1mA}$) under atmospheric pressure, in a constant temperature tank in a 200° C. atmosphere. It was noted that the resistive leakage current ($I_R$) is the current produced by the resistive component when the electrical characteristics at the grain boundaries of a zinc oxide element are qualitatively expressed using an electrical equivalent circuit. Smaller values of this resistive leakage current ($I_R$) indicate superior thermal stability at high temperature.

In the evaluation of the energy absorption capability, the energy absorption capability was evaluated in terms of the energy value (J/cc) obtained by measuring the energy value (J/cc) absorbed before disintegration on continued application of voltage of the commercial frequency (50 Hz) of 1.3 times the varistor voltage ($V_{1mA}$). "Before disintegration" means before generation of cracks in the current-voltage non-linear resistor was detected by an AE (acoustic emission) detector. Larger values of this energy value (J/cc) indicate superior energy absorption capability. An AE detector is a device that detects acoustic waves in the ultrasonic region generated when phenomena such as micro-deformation or disintegration such as cracking occur in a solid body such as metallic material.

For each of the evaluation tests described above, 10 current-voltage non-linear resistors were respectively manufactured and the evaluation was taken as the average of the values obtained by performing the tests on each of the 10 resistors.

As shown in Table 1, it was found that, for the current-voltage non-linear resistors according to the present invention, in each case, the varistor voltage ($V_{1mA}$) was at least 400V/mm, the coefficient of non-linearity ($V_{10kA}/V_{1mA}$) was smaller than 1.5, the resistive leakage current ($I_R$) was smaller than 15 mA, and the energy absorption capability was more than 500 J/cc. Also, it was found that, with the current-voltage non-linear resistors according to the present invention, higher resistance, superior non-linear characteristics, thermal stability and energy absorption capability were obtained compared with the comparative examples, which were outside the scope of the present invention.

Also, as shown in FIG. 2, by making the average grain size of the mixture no more than 0.40 μm, the varistor voltage ($V_{1mA}$) in the current-voltage non-linear resistor becomes high and the variability of the varistor voltage ($V_{1mA}$) between samples becomes small, and fully satisfactory energy absorption capability is achieved.

From the above results, it can be seen that, with a current-voltage non-linear resistor comprising a sintered body of a mixture with average grain size no more than 0.40 μm and including as chief constituent zinc oxide (ZnO) and as auxiliary constituents at least bismuth (Bi), antimony (Sb), manganese (Mn), cobalt (Co) and nickel (Ni), the current-voltage non-linear resistor that is obtained has excellent non-linear resistance characteristics, thermal stability and energy absorption capability.

(Effect of Standard Deviation Based on Grain Size Distribution of the Mixture)

The effect of standard deviation based on grain size distribution of the mixture on the characteristics of a current-voltage non-linear resistor of a mixture including as chief constituent zinc oxide (ZnO) and as auxiliary constituents at least bismuth (Bi), antimony (Sb), manganese (Mn), cobalt (Co) and nickel (Ni) will now be described.

Table 2 shows the pulverization conditions, mixture conditions, varistor voltage ($V_{1mA}$), coefficient of non-linearity ($V_{10kA}/V_{1mA}$), resistive leakage current ($I_R$) and energy absorption capability in the current-voltage non-linear resistors of sample No. 25 to sample No. 36. In Table 2, the symbol "*" indicates samples outside the scope of the present invention: samples to which this symbol is affixed are comparative examples.

TABLE 2

| | Pulverization conditions | | | | Mixture conditions | | | Varistor | | Resistive | Energy |
|---|---|---|---|---|---|---|---|---|---|---|---|
| Sample No. | Zr bead diameter mm | Bead packing ratio, % | Rotor rotary speed, rpm | Flow rate, L/min | Average grain size (μ), μm | Standard deviation (σ), μm | σ/μ, % | voltage ($V_{1mA}$), V/mm | Coefficient of non-linearity ($V_{10kA}/V_{1mA}$) | leakage current, mA | absorption capability, J/cc |
| 25* | 0.3 | 65 | 1000 | 10 | 0.3 | 0.36 | 120 | 468 | 1.458 | 9.9 | 587 |
| 26: | 0.3 | 70 | 1000 | 10 | 0.3 | 0.31 | 103.3 | 464 | 1.46 | 10.1 | 599 |
| 27* | 0.3 | 75 | 1000 | 10 | 0.3 | 0.26 | 86.7 | 471 | 1.451 | 9.2 | 607 |
| 28 | 0.3 | 80 | 1000 | 10 | 0.3 | 0.22 | 73.3 | 466 | 1.436 | 8.1 | 632 |
| 29 | 0.3 | 85 | 1000 | 10 | 0.3 | 0.17 | 56.7 | 470 | 1.432 | 7.5 | 655 |
| 30 | 0.3 | 90 | 1000 | 10 | 0.3 | 0.12 | 40 | 469 | 1.429 | 6.9 | 667 |
| 31* | 0.3 | 80 | 700 | 10 | 0.3 | 0.41 | 136.7 | 461 | 1.467 | 10.7 | 580 |
| 32* | 0.3 | 80 | 800 | 10 | 0.3 | 0.33 | 110 | 472 | 1.462 | 10.5 | 588 |
| 33* | 0.3 | 80 | 900 | 10 | 0.3 | 0.28 | 93.3 | 468 | 1.451 | 9.9 | 612 |
| 34 | 0.3 | 80 | 1000 | 10 | 0.3 | 0.22 | 73.3 | 466 | 1.436 | 8.1 | 632 |
| 35 | 0.3 | 80 | 1100 | 10 | 0.3 | 0.19 | 63.3 | 471 | 1.428 | 7.9 | 645 |
| 36 | 0.3 | 80 | 1200 | 10 | 0.3 | 0.15 | 50 | 467 | 1.43 | 7.7 | 658 |

First of all, as the chief constituent, zinc oxide (ZnO) was employed. To this were then added, as auxiliary constituents, respectively 0.5 mol % of bismuth oxide ($Bi_2O_3$), manganese oxide (MnO) and nickel oxide (NiO), 1 mol % of cobalt oxide ($CO_2O_3$), 2 mol % of antimony trioxide ($Sb_2O_3$), and 0.005 mol % of aluminum in the form of an aqueous solution of aluminum hydroxide ($Al(OH)_3$). The balance was zinc oxide.

A combined material consisting of a mixture prepared as described above and water and organic binder prepared such that the content of this mixture was 40 weight % was introduced into a circulatory-type wet pulverizing apparatus. Also, in this wet pulverizing apparatus, pulverizing and mixing were performed with the diameter of the zirconia beads, packing ratio of the beads in the vessel, rotational speed of the stirring rotor, and circulatory flow rate set as shown in the pulverization conditions of Table 2. Pulverization was conducted in the wet pulverizing apparatus so that the average grain size of the mixture was 0.3 μm and such that the ratio (σ/ρ) of the standard deviation (σ) based on the grain size distribution of the mixture to the average grain size (μ) of the mixture had the values of sample No. 25 to sample No. 36 shown in Table 2. Uniformly mixed slurries were obtained by the pulverizing and mixing treatment performed in this wet pulverizing apparatus.

The average grain size of the mixture was measured using a grain size distribution measurement apparatus of the laser diffraction/dispersion type, in the condition of a solution of the slurry as extracted from the wet pulverizing apparatus. Also this average grain size is the average grain size at the median diameter. Also, the standard deviation was found based on the grain size distribution of the mixture measured using the grain size distribution measurement apparatus referred to above.

Spray pelletization of this slurry was then conducted using a spray drier, to obtain grain sizes of 70 to 130 μm. Moldings were then produced by molding the pelletized powder obtained into cylindrical shapes of diameter 125 mm, thickness 30 mm using for example a hydraulic press molding machine.

Next, these moldings were heated to a temperature of 500° C. and held at this temperature for two hours to remove the organic binder constituted by the organic solvent.

Next, the temperature of the moldings was temporarily cooled to normal temperature, after which the moldings were heated to a sintering temperature of 1200°, and sintering conducted while maintaining this temperature for three hours. Sintering was conducted by placing the moldings in an alumina refractory vessel and employing a tunnel-type continuous furnace. The heating rate up to the sintering temperature was 100° C./hour.

After the lapse of the holding time of the sintering temperature, the sintered moldings were cooled. The cooling rate during cooling was 100° C./hour. Sintered bodies were obtained on completion of this cooling step.

The subsequent steps in the manufacture of the current-voltage non-linear resistor are the same as these steps in the manufacture of a current-voltage non-linear resistor when investigating the effect of the average grain size of the mixture as described above.

The varistor voltage ($V_{1mA}$), the non-linear resistance characteristic, thermal stability and energy absorption capability in respect of the current-voltage non-linear resistors of sample No. 25 to sample No. 36 that were obtained were then evaluated. The test conditions and test method for evaluation of the varistor voltage ($V_{1mA}$), non-linear resistance characteristic, thermal stability and energy absorption capability were the same as the test conditions and test method when investigating the effect of the average grain size of the mixture as described above.

As shown in Table 2, when the ratio ($\sigma/\mu$) of the standard deviation ($\sigma$) based on the grain size distribution of the mixture with respect to the average grain size ($\mu$) of the mixture is no more than 75%, increased resistance, excellent non-linear resistance characteristics, thermal stability and energy absorption capability are obtained. This is believed to be because, by making the ratio ($\sigma/\mu$) of the standard deviation ($\sigma$) based on the grain size distribution of the mixture with respect to the average grain size ($\mu$) of the mixture no more than 75%, the result is that the raw material is uniformly distributed, and the grain size of the zinc oxide grains in the sintered body is made uniform.

(Effect of the Content of the Various Composition Constituents of the Mixture)

The effects that the contents of the various composition constituents of a mixture containing as chief constituent zinc oxide (ZnO) and, as auxiliary constituents at least bismuth (Bi), antimony (Sb), manganese (Mn), cobalt (Co), and nickel (Ni) have on the performance of a current-voltage non-linear resistor will now be described.

Table 3 shows the composition constituents of the mixture, the varistor voltage ($V_{1mA}$), the coefficient of non-linearity ($V_{10kA}/V_{1mA}$) and the resistive leakage current ($I_R$) in the current-voltage non-linear resistors of sample No. 37 to sample No. 86. In Table 3, the symbol "*" indicates samples outside the scope of the present invention: samples to which this symbol is affixed are comparative examples.

TABLE 3

| Sample number | Composition constituents of the mixture, mol % | | | | | | Varistor voltage ($V_{1\,mA}$), V/mm | Coefficient of non-linearity ($V_{10\,kA}/V_{1\,mA}$) | Resistive leakage current mA |
|---|---|---|---|---|---|---|---|---|---|
| | ZnO | Bi$_2$O$_3$ | Sb$_2$O$_3$ | Co$_2$O$_3$ | MnO | NiO | | | |
| 37* | 96.25 | 0.5 | 2 | 0.25 | 0.5 | 0.5 | 465 | 1.549 | 17.2 |
| 38 | 96 | 0.5 | 2 | 0.5 | 0.5 | 0.5 | 469 | 1.457 | 8.4 |
| 39 | 95.75 | 0.5 | 2 | 0.75 | 0.5 | 0.5 | 466 | 1.448 | 10.8 |
| 40* | 94.5 | 0.5 | 2 | 1 | 1 | 1 | 478 | 1.451 | 16.2 |
| 41 | 95 | 0.5 | 2 | 1 | 1 | 0.5 | 470 | 1.452 | 9.8 |
| 42* | 95.25 | 0.5 | 2 | 1 | 1 | 0.25 | 432 | 1.557 | 14.3 |
| 43* | 94.75 | 0.5 | 2 | 1 | 1.25 | 0.5 | 467 | 1.502 | 20 |
| 44 | 95.25 | 0.5 | 2 | 1 | 0.75 | 0.5 | 468 | 1.442 | 9.9 |
| 45 | 95.5 | 0.5 | 2 | 1 | 0.5 | 0.5 | 466 | 1.436 | 8.1 |
| 46 | 95.75 | 0.5 | 2 | 1 | 0.25 | 0.5 | 467 | 1.436 | 7.2 |
| 47 | 95.25 | 0.5 | 2 | 1.25 | 0.5 | 0.5 | 462 | 1.428 | 7.5 |
| 48 | 95.25 | 0.5 | 2 | 1.5 | 0.25 | 0.5 | 471 | 1.43 | 8 |
| 49* | 95.75 | 0.5 | 2.5 | 0.25 | 0.5 | 0.5 | 530 | 1.522 | 20.6 |
| 50 | 95.25 | 0.5 | 2.5 | 0.75 | 0.5 | 0.5 | 561 | 1.388 | 10.8 |
| 51 | 95 | 0.5 | 2.5 | 0.75 | 0.75 | 0.5 | 545 | 1.395 | 12 |
| 52* | 94.75 | 0.5 | 2.5 | 0.75 | 1 | 0.5 | 531 | 1.412 | 17.8 |
| 53 | 95 | 0.5 | 2.5 | 0.75 | 0.5 | 0.75 | 549 | 1.395 | 11.2 |
| 54 | 95 | 0.5 | 2.5 | 1 | 0.5 | 0.5 | 537 | 1.401 | 9.3 |
| 55* | 94.75 | 0.5 | 2.5 | 1 | 0.75 | 0.5 | 568 | 1.398 | 19.2 |
| 56* | 94.75 | 0.5 | 2.5 | 1 | 0.5 | 0.75 | 562 | 1.395 | 16.8 |
| 57* | 95 | 0.5 | 3 | 0.5 | 0.5 | 0.5 | 628 | 1.38 | 23.4 |
| 58* | 94.5 | 0.5 | 3 | 1 | 0.5 | 0.5 | 630 | 1.382 | 25.2 |
| 59 | 95.75 | 0.75 | 2 | 0.5 | 0.5 | 0.5 | 441 | 1.451 | 8.4 |
| 60 | 95.25 | 0.75 | 2 | 1 | 0.5 | 0.5 | 445 | 1.448 | 7.5 |
| 61 | 95 | 0.75 | 2 | 1 | 0.75 | 0.5 | 438 | 1.462 | 10.8 |

TABLE 3-continued

| Sample number | Composition constituents of the mixture, mol % | | | | | | Varistor voltage ($V_{1mA}$), V/mm | Coefficient of non-linearity ($V_{10kA}/V_{1mA}$) | Resistive leakage current mA |
|---|---|---|---|---|---|---|---|---|---|
| | ZnO | $Bi_2O_3$ | $Sb_2O_3$ | $Co_2O_3$ | MnO | NiO | | | |
| 62* | 94.75 | 0.75 | 2 | 1 | 1 | 0.5 | 435 | 1.475 | 15.8 |
| 63 | 95.25 | 0.75 | 2.5 | 0.5 | 0.5 | 0.5 | 508 | 1.408 | 10.5 |
| 64 | 95 | 0.75 | 2.5 | 0.75 | 0.5 | 0.5 | 512 | 1.415 | 10.2 |
| 65* | 94.75 | 0.75 | 2.5 | 1 | 0.5 | 0.5 | 506 | 1.422 | 17.5 |
| 66* | 94.5 | 0.75 | 2.5 | 1 | 0.75 | 0.5 | 527 | 1.399 | 20.9 |
| 67 | 95 | 0.75 | 2.5 | 1 | 0.25 | 0.5 | 511 | 1.402 | 9.6 |
| 68* | 94.5 | 0.75 | 2.5 | 1 | 0.5 | 0.75 | 515 | 1.426 | 18.8 |
| 69* | 95 | 0.75 | 2.5 | 1 | 0.5 | 0.25 | 498 | 1.534 | 15.2 |
| 70* | 94.75 | 0.75 | 3 | 0.5 | 0.5 | 0.5 | 572 | 1.376 | 26.9 |
| 71* | 94.75 | 0.75 | 3 | 1 | 0.5 | 0.5 | 568 | 1.385 | 22.4 |
| 72 | 95.5 | 1 | 2 | 0.5 | 0.5 | 0.5 | 403 | 1.473 | 7.3 |
| 73 | 95.25 | 1 | 2 | 0.75 | 0.5 | 0.5 | 411 | 1.466 | 6.6 |
| 74 | 95 | 1 | 2 | 0.75 | 0.75 | 0.5 | 409 | 1.461 | 7.5 |
| 75 | 95 | 1 | 2 | 0.75 | 0.5 | 0.75 | 405 | 1.472 | 6.2 |
| 76* | 95 | 1 | 2 | 0.75 | 1 | 0.25 | 389 | 1.587 | 16.8 |
| 77* | 94 | 1 | 2 | 1 | 1 | 1 | 405 | 1.523 | 15.2 |
| 78 | 95 | 1 | 2 | 1 | 0.5 | 0.5 | 412 | 1.475 | 7.2 |
| 79 | 95 | 1 | 2.5 | 0.5 | 0.5 | 0.5 | 442 | 1.459 | 9.6 |
| 80 | 95.25 | 1 | 2.5 | 0.5 | 0.25 | 0.5 | 431 | 1.453 | 8.7 |
| 81* | 94.75 | 1 | 2.5 | 0.5 | 0.75 | 0.5 | 429 | 1.45 | 17.4 |
| 82* | 95 | 1 | 2.5 | 0.5 | 0.75 | 0.25 | 449 | 1.537 | 19.1 |
| 83* | 94.5 | 1 | 2.5 | 1 | 0.5 | 0.5 | 425 | 1.458 | 16.2 |
| 84* | 94.75 | 1 | 2.5 | 1 | 0.5 | 0.25 | 416 | 1.549 | 18 |
| 85* | 94.5 | 1 | 3 | 0.5 | 0.5 | 0.5 | 468 | 1.433 | 16.9 |
| 86* | 93.5 | 1 | 3 | 1 | 1 | 0.5 | 458 | 1.441 | 17.3 |

First of all, the contents of the various composition constituents of a mixture containing as chief constituent zinc oxide (ZnO) and, as auxiliary constituents at least bismuth (Bi), antimony (Sb), manganese (Mn), cobalt (Co), and nickel (Ni) were adjusted to the values of sample No. 37 to sample No. 86 shown in Table 3.

Combined materials consisting of mixtures prepared as described above and water and organic binder prepared such that the content of this mixture was 40 weight % were introduced into a circulatory-type wet pulverizing apparatus. Also, in this wet pulverizing apparatus, zirconia beads of diameter 0.3 mm were employed, and pulverizing and mixing were performed with a packing ratio of the beads in the vessel of 80%, a rotational speed of the stirring rotor of 1000 rpm, and a circulatory flow rate of 10 L/min. Pulverization was conducted in the wet pulverizing apparatus so that the average grain size of the mixture was 0.3 μm. Uniformly mixed slurries were obtained by the pulverizing and mixing treatment performed in this wet pulverizing apparatus.

The average grain size of the mixture was measured using a grain size distribution measurement apparatus of the laser diffraction/dispersion type, in the condition of a solution of the slurry as extracted from the wet pulverizing apparatus. Also this average grain size is the average grain size at the median diameter.

Next, spray pelletization of this slurry was then conducted using a spray drier, to obtain grain sizes of 70 to 130 μm. Moldings were then produced by molding the pelletized powder obtained into cylindrical shapes of diameter 125 mm, thickness 30 mm using for example a hydraulic press molding machine.

Next, these moldings were heated to a temperature of 500° C. and held at this temperature for two hours to remove the organic binder constituted by the organic solvent.

Next, the temperature of the moldings was temporarily cooled to normal temperature, after which the moldings were heated to a sintering temperature of 1200° C., and sintering conducted while maintaining this temperature for three hours. Sintering was conducted by placing the moldings in an alumina refractory vessel and employing a tunnel-type continuous furnace. The heating rate to the sintering temperature was 100° C./hour.

After the lapse of the sintering temperature holding time, the sintered moldings were cooled. The cooling rate during cooling was 100° C./hour. Sintered bodies were obtained on completion of this cooling step.

The subsequent steps in the manufacture of the current-voltage non-linear resistor are the same as these steps in the manufacture of a current-voltage non-linear resistor when investigating the effect of the average grain size of the mixture as described above.

The varistor voltage ($V_{1mA}$), the non-linear resistance characteristic and thermal stability in respect of the current-voltage non-linear resistors of sample No. 37 to sample No. 86 that were obtained were then evaluated. The test conditions and test method for evaluation of the varistor voltage ($V_{1mA}$), non-linear resistance characteristic and thermal stability were the same as the test conditions and test method when investigating the effect of the average grain size of the mixture as described above.

It can be seen from Table 3 that, with current-voltage non-linear resistors according to the present invention the varistor voltage ($V_{1mA}$) is in each case at least 400V/mm, the coefficient of non-linearity ($V_{10kA}/V_{1mA}$) is smaller than 1.5, and the resistive leakage current ($I_R$) is smaller than 15 mA. It can also be seen that, in the case of the current-voltage non-linear resistors according to the present invention, higher resistance, and better non-linear resistance characteristics and thermal stability are obtained than with the comparative examples, which are outside the scope of the present invention.

From the above results, it can be seen that, with current-voltage non-linear resistors according to the present invention comprising a sintered body of a mixture containing as chief constituent at least 95 mol % of zinc oxide, and, as auxiliary constituents, 0.3 to 1 mol % of $Bi_2O_3$, 0.5 to 2.5 mol % of $Sb_2O_3$, 0.3 to 1.5 mol % of $CO_2O_3$, 0.2 to 2 mol % of MnO, and 0.5 to 3 mol % of NiO, respectively calculated as $Bi_2O_3$, $Sb_2O_3$, $CO_2O_3$, MnO, and NiO, higher resistance, and better non-linear resistance characteristics and thermal stability are obtained.

(Effect of the Average Grain Size etc of the Zinc Oxide Grains in the Sintered Body)

The effect of the standard deviation based on the average grain size of the zinc oxide grains in the sintered body and grain size distribution of the zinc oxide grains in the sintered body on the characteristics of a current-voltage non-linear resistor will now be described.

Table 4 shows the grain size conditions of the zinc oxide grains, the varistor voltage ($V_{1mA}$), the coefficient of non-linearity ($V_{10kA}/V_{1mA}$), the resistive leakage current ($I_R$) and the energy absorption capability in current-voltage non-linear resistors selected from the samples shown in Table 1 to Table 3. In Table 4, the symbol "*" indicates samples outside the scope of the present invention: samples to which this symbol is affixed are comparative examples.

bility were evaluated for the current-voltage non-linear resistors of these sample numbers. The test conditions and test method for evaluation of the varistor voltage ($V_{1mA}$), non-linear resistance characteristic, thermal stability and energy absorption capability were the same as the test conditions and test method when investigating the effect of the average grain size of the mixture as described above.

As shown in Table 4, with the samples according to the present invention, the average grain size of the zinc oxide grains in the sintered body was no more than 7.5 µm, and the standard deviation based on the grain size distribution of the zinc oxide grains in the sintered body was no more than 15% of the average grain size of the zinc oxide grains. Also it can be seen that, for the samples according to the present invention, in each case, the varistor voltage ($V_{1mA}$) is at least 400V/mm, the coefficient of non-linearity ($V_{10kA}/V_{1mA}$) is smaller than 1.5, the resistive leakage current ($I_R$) is smaller than 15 mA, and the energy absorption capability is larger than 500 J/cc. Also, it can be seen that, with the current-voltage non-linear resistors according to the present invention, compared with the comparative examples, which are

TABLE 4

| Sample No. | Grain size conditions of zinc oxide grains | | | Varistor voltage ($V_{1mA}$), V/mm | Coefficient of non-linearity ($V_{10kA}/V_{1mA}$) | Resistive leakage current, mA | Energy absorption capability, J/cc |
|---|---|---|---|---|---|---|---|
| | Average grain size (µ), µm | Standard deviation (σ), µm | σ/µ, % | | | | |
| 10* | 9.2 | 1.6 | 17.4 | 357 | 1.555 | 16.3 | 436 |
| 2* | 7.9 | 2 | 25.3 | 398 | 1.542 | 18.3 | 415 |
| 1* | 8.4 | 2.4 | 28.6 | 386 | 1.549 | 19.2 | 402 |
| 78 | 7.1 | 1 | 14.1 | 412 | 1.475 | 7.2 | 681 |
| 73 | 7.2 | 0.9 | 12.5 | 411 | 1.466 | 6.6 | 682 |
| 4* | 6.7 | 1.4 | 20.9 | 449 | 1.498 | 15.6 | 450 |
| 82* | 6.5 | 2.3 | 35.4 | 449 | 1.537 | 19.1 | 422 |
| 21 | 6.7 | 0.9 | 13.4 | 438 | 1.451 | 9.2 | 599 |
| 30 | 6.7 | 0.5 | 7.5 | 469 | 1.429 | 6.9 | 667 |
| 55* | 6.1 | 1.1 | 18 | 568 | 1.398 | 19.2 | 517 |
| 50 | 5.7 | 0.7 | 12.3 | 561 | 1.388 | 10.8 | 580 |
| 57* | 5.4 | 1 | 18.5 | 628 | 1.38 | 23.4 | 502 |
| 7 | 5.4 | 0.7 | 13 | 594 | 1.372 | 10.4 | 583 |
| 8 | 5.4 | 0.5 | 9.3 | 605 | 1.367 | 10.2 | 596 |

The average grain size (µ) of the zinc oxide grains in the sintered body and the standard deviation (σ) based on the grain size distribution of the zinc oxide grains in the sintered body were measured in respect of the current-voltage non-linear resistors of the sample numbers shown in Table 4.

The average grain size of the zinc oxide grains in the sintered body was found by using a scanning electron microscope (SEM) to observe the reflected electron image of the specular ground surface of a sample cut out from the interior of the sintered body. Specifically, three samples were cut out in respect of each of the samples of sample No. 87 to sample No. 102, and SEM photographs were taken with magnification of 1000 times at five locations with different fields of view for each sample that was cut out and the average grain size of zinc oxide grains was found by measuring the grain size of about 3000 zinc oxide grains. Also, the standard deviation was calculated from the grain size distribution of the zinc oxide grains in the sintered body obtained from the measured average grain size.

Also, the varistor voltage ($V_{1mA}$), non-linear resistance characteristic, thermal stability and energy absorption capaoutside the scope of the present invention, higher resistance can be achieved and excellent non-linear resistance characteristics, thermal stability and energy absorption capability are obtained.

(Effect of the Average Grain Size etc of the Spinel Grains in the Sintered Body)

The effect of the average grain size etc of the spinel grains, whose chief constituent is $Zn_7Sb_2O_{12}$, in the sintered body, and the standard deviation, based on the grain size distribution of the spinel grains, whose chief constituent is $Zn_7Sb_2O_{12}$, in the sintered body on the properties of the current-voltage non-linear resistor will now be described.

Table 5 shows the grain size conditions of the spinel grains, the varistor voltage ($V_{1mA}$), the coefficient of non-linearity ($V_{10kA}/V_{1mA}$), the resistive leakage current ($I_R$) and the energy absorption capability in current-voltage non-linear resistors selected from the samples shown in Table 1 to Table 3. In Table 5, the symbol "*" indicates samples outside the scope of the present invention: samples to which this symbol is affixed are comparative examples.

TABLE 5

| Sample No. | Grain size conditions of spinel grains | | | Varistor voltage ($V_{1mA}$), V/mm | Coefficient of non-linearity ($V_{10kA}/V_{1mA}$) | Resistive leakage current, mA | Energy absorption capability, J/cc |
|---|---|---|---|---|---|---|---|
| | Average grain size ($\mu$), μm | Standard deviation ($\sigma$), μm | $\sigma/\mu$, % | | | | |
| 37* | 1.85 | 0.98 | 53 | 465 | 1.549 | 17.2 | 372 |
| 43* | 1.89 | 1.16 | 61.4 | 467 | 1.502 | 20 | 451 |
| 49* | 1.56 | 0.6 | 38.5 | 530 | 1.522 | 20.6 | 436 |
| 52* | 1.17 | 0.62 | 53 | 531 | 1.412 | 17.8 | 466 |
| 56* | 0.82 | 0.35 | 42.7 | 562 | 1.395 | 16.8 | 438 |
| 71* | 0.86 | 0.43 | 50 | 568 | 1.385 | 22.4 | 495 |
| 5 | 0.88 | 0.33 | 37.5 | 547 | 1.413 | 12.6 | 521 |
| 54 | 0.92 | 0.24 | 26.1 | 537 | 1.401 | 9.3 | 580 |
| 6 | 0.82 | 0.27 | 32.9 | 577 | 1.388 | 10.9 | 558 |
| 24 | 0.95 | 0.15 | 15.8 | 512 | 1.419 | 7.4 | 672 |
| 70* | 0.77 | 0.42 | 54.5 | 572 | 1.376 | 26.9 | 513 |
| 8 | 0.7 | 0.14 | 20 | 605 | 1.367 | 10.2 | 596 |
| 16 | 0.81 | 0.15 | 18.5 | 563 | 1.383 | 8.2 | 632 |

The average grain size ($\mu$) of the spinel grains, whose chief constituent is $Zn_7Sb_2O_{12}$, in the sintered body and the standard deviation ($\sigma$) based on the grain size distribution of the spinel grains, whose chief constituent is $Zn_7Sb_2O_{12}$ in the sintered body were measured in respect of the current-voltage non-linear resistors of the sample numbers shown in Table 5.

The average grain size of the spinel grains, whose chief constituent is $Zn_7Sb_2O_{12}$ in the sintered body was found by using a scanning electron microscope (SEM) to observe the reflected electron image of the specular ground surface of a sample cut out from the interior of the sintered body. Specifically, three samples were cut out in respect of each of the samples of sample No. 103 to sample No. 118, and SEM photographs were taken with magnification of 1000 times at five locations with different fields of view for each sample that was cut out and the average grain size of spinel grains was found by measuring the grain size of about 3000 spinel grains. Also, the standard deviation was calculated from the grain size distribution of the spinel grains, whose chief constituent is $Zn_7Sb_2O_{12}$, in the sintered body obtained from the measured average grain size.

Also, the varistor voltage ($V_{1mA}$), non-linear resistance characteristic, thermal stability and energy absorption capability were evaluated for the current-voltage non-linear resistors of these sample numbers. The test conditions and test method for evaluation of the varistor voltage ($V_{1mA}$), non-linear resistance characteristic, thermal stability and energy absorption capability were the same as the test conditions and test method when investigating the effect of the average grain size of the mixture as described above.

As shown in Table 5, with the samples according to the present invention, the average grain size of the spinel grains, whose chief constituent is $Zn_7Sb_2O_{12}$ in the sintered body, was no more than 1 μm, and the standard deviation based on the grain size distribution of the spinel grains, whose chief constituent is $Zn_7Sb_2O_{12}$ in the sintered body was no more than 40% of the average grain size of the spinel grains. Also it can be seen that, for the samples according to the present invention, in each case, the varistor voltage ($V_{1mA}$) is at least 400V/mm, the coefficient of non-linearity ($V_{10kA}/V_{1mA}$) is smaller than 1.5, the resistive leakage current ($I_R$) is smaller than 15 mA, and the energy absorption capability is larger than 500 J/cc. Also, it can be seen that, with the current-voltage non-linear resistors according to the present invention, compared with the comparative examples, which are outside the scope of the present invention, higher resistance can be achieved and excellent non-linear resistance characteristics, thermal stability and energy absorption capability are obtained.

While practical examples of the present invention have been specifically described above, the present invention is not restricted solely to these practical examples, and can be modified in various ways without departing from its gist.

What is claimed is:

1. A current-voltage non-linear resistor comprising:
    a sintered body of a mixture whose chief constituent is zinc oxide and including as auxiliary constituents at least Bi, Sb, Mn, Co and Ni, wherein
    an average grain size of said mixture is no more than 0.4 μm; and
    an average grain size of a zinc oxide grains in said sintered body is no more than 7.5 μm and a standard deviation based on a grain size distribution of zinc oxide grains in said sintered body is no more than 15% of said average grain size of said zinc oxide grains,
    wherein an average grain size of spinel grains whose chief constituent is $Zn_7Sb_2O_{12}$ in said sintered body is no more than 1 μm and a standard deviation based on a grain size distribution of spinel grains whose chief constituent is $Zn_7Sb_2O_{12}$ in said sintered body is no more than 40% of said average grain size of said spinel grains, and
    wherein said standard deviation based on said grain size distribution of said mixture is no more than 75% of said average grain size of said mixture.

2. The current-voltage non-linear resistor according to claim 1,
    containing as auxiliary constituents of said mixture 0.3 to 1 mol % of $Bi_2O_3$, 0.5 to 2.5 mol % of $Sb_2O_3$, 0.3 to 1.5 mol % of $Co_2O_3$, 0.2 to 2 mol % of MnO, and 0.5 to 3 mol % of NiO, respectively calculated as $Bi_2O_3$, $Sb_2O_3$, $Co_2O_3$, MnO, and NiO, and containing at least 95 mol % of said zinc oxide main constituent.

3. The current-voltage non-linear resistor according to claim 1,
    wherein a varistor voltage ($V_{1mA}$), which is a voltage when a current of commercial frequency of 1 mA is passed, is at least 400V/mm.

* * * * *